United States Patent
Edvold et al.

(10) Patent No.: US 6,603,914 B2
(45) Date of Patent: Aug. 5, 2003

(54) DISPERSION COMPENSATING FIBER WITH REDUCED SPLICE LOSS AND METHODS FOR MAKING SAME

(75) Inventors: Bent Edvold, Vallensbaek (DK); Lars Gruner-Nielsen, Broenshoej (DK); Stig Nissen Knudsen, Copenhagen N. (DK); Torben Erik Veng, Broendby (DK)

(73) Assignee: Fitel USA Corp., Norcross, GA (US)

( * ) Notice: Subject to any disclaimer, the term of this patent is extended or adjusted under 35 U.S.C. 154(b) by 179 days.

(21) Appl. No.: 09/778,413

(22) Filed: Feb. 7, 2001

(65) Prior Publication Data

US 2002/0159735 A1 Oct. 31, 2002

(51) Int. Cl.⁷ .................................................. G02B 6/02
(52) U.S. Cl. ........................ 385/127; 385/126; 385/141; 385/142; 385/144
(58) Field of Search ................................ 385/126–128, 385/141, 142, 144; 665/376, 378, 397, 398, 409, 412, 415, 475, 477

(56) References Cited

U.S. PATENT DOCUMENTS

| 4,447,125 A |   | 5/1984 | Lazay et al. |
| 4,566,754 A | * | 1/1986 | Beales et al. ............... 385/123 |
| 5,740,297 A | * | 4/1998 | Onishi et al. ............... 385/127 |

FOREIGN PATENT DOCUMENTS

| EP | 0762159 | 3/1997 |
| EP | 1028329 | 8/2000 |
| WO | WO 99/08142 | 2/1999 |

OTHER PUBLICATIONS

Li Y.W. et al., "Triple–Clad Single–Mode Fibers for Dispersion Shifting," Journal of Lightwave Technology, Nov. 01, 1993, pp. 1812–1819, vol. 11, No. 11, IEEE, New York, US.

* cited by examiner

*Primary Examiner*—Rodney Bovernick
*Assistant Examiner*—Juliana K. Kang
(74) *Attorney, Agent, or Firm*—Priest & Goldstein, PLLC

(57) ABSTRACT

A dispersion compensating fiber is described having a core and cladding as well as methods for making such fiber. The cladding has a first cladding region surrounding the core, a second cladding region surrounding the first cladding region, and a third cladding region surrounding the second cladding region. The core, and the first, second, and third cladding regions are doped to create a refraction index profile characteristic of dispersion compensating fiber. The core is doped with germanium, the first cladding region is doped with fluorine, and the second cladding region is doped with germanium and fluorine. A portion of the cladding is doped with phosphorus, thereby resulting in splice loss reduction.

12 Claims, 5 Drawing Sheets

| SPLICE LOSS FOR DCF WITHOUT P IN CLADDING (dB): |
|---|
| 0.63 |
| 0.65 |
| 0.72 |
| 0.71 |
| 0.68 |
| 0.66 |
| 0.73 |

| SPLICE LOSS FOR DCF WITH P IN CLADDING (dB): |
|---|
| 0.33 |
| 0.38 |
| 0.37 |
| 0.39 |
| 0.32 |
| 0.25 |
| 0.33 |

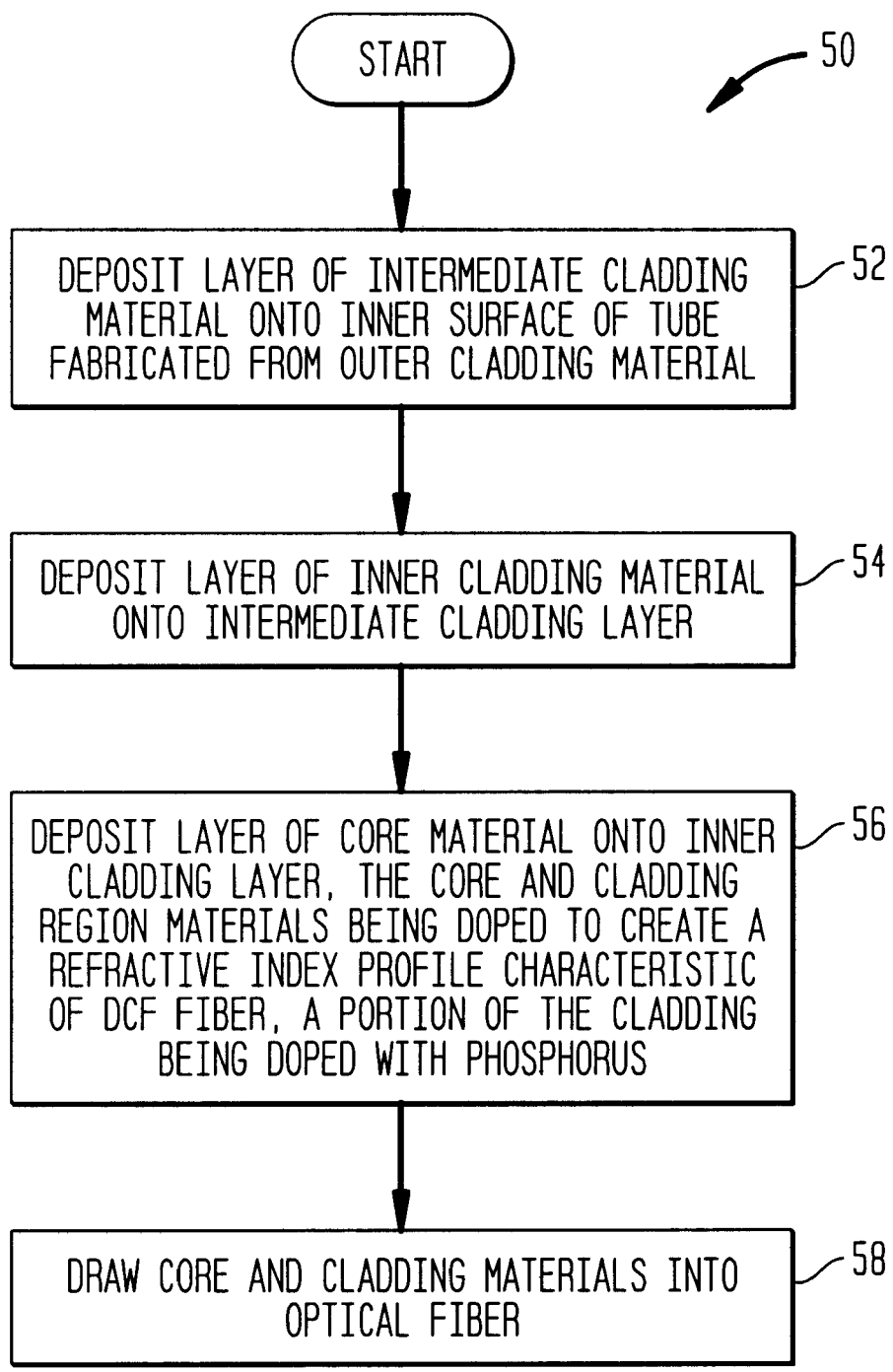

DISPERSION COMPENSATING FIBER WITH REDUCED SPLICE LOSS AND METHODS FOR MAKING SAME

BACKGROUND OF THE INVENTION

1. Field of the Invention

The present invention relates generally to improvements to optical fiber, and more particularly to advantageous aspects of a dispersion-compensating fiber with reduced splice loss and methods for making same.

2. Description of the Prior Art

A new class of optical fibers has recently been developed known as dispersion-compensating fiber (DCF), which has a steeply sloped, negative dispersion characteristic. One use for DCF is to optimize the dispersion characteristics of already existing optical fiber links fabricated from standard single-mode fibers (SSMF) for operation at a different wavelength. This technique is disclosed in U.S. patent application Ser. No. 09/596,454, filed on Jun. 19, 2000, assigned to the assignee of the present application, the drawings and disclosure of which are hereby incorporated by reference in their entirety.

An important parameter for DCF is the excess loss that results when DCF is spliced to SSMF. To obtain a highly negative dispersion, DCF uses a small core with a high refractive index, having a mode-field diameter of approximately 5.0 $\mu$m at 1550 nm, compared with the approximately 10.5 $\mu$m mode-field diameter of SSMF at 1550 nm. The difference in core diameters results in significant signal loss when a fusion splicing technique is used to connect DCF to SSMF. It is possible to reduce the amount of signal loss by choosing splicing parameters that allow the core of the DCF to diffuse, thereby causing the mode-field diameter of the DCF core to taper outwards, resulting in a funneling effect. However, the amount and duration of the heat required to produce the funneling effect result in an undesirable diffusion of fluorine dopant in cladding surrounding the DCF core. This fluorine diffusion limits the amount of splice loss reduction that can be obtained using a mode-field expansion technique.

There is thus a need for improved techniques for splicing DCF to SSMF that reduces splice loss below current limits.

SUMMARY OF THE INVENTION

The above-described issues and others are addressed by the present invention, one aspect of which provides a dispersion compensating fiber having a core and cladding. The cladding has a first cladding region surrounding the core, a second cladding region surrounding the first cladding layer, and a third cladding region surrounding the second cladding layer. The core, and the first, second, and third cladding regions are doped to create a refraction index profile characteristic of dispersion compensating fiber. In addition, a portion of the cladding is doped with phosphorus, thereby resulting in splice loss reduction.

Additional features and advantages of the present invention will become apparent by reference to the following detailed description and accompanying drawings.

BRIEF DESCRIPTION OF THE DRAWINGS

FIG. 7 shows a table setting forth splice loss data for a length of DCF, without phosphorus in its cladding.

FIG. 8 shows a table setting forth splice loss data for a length of DCF fabricated in accordance with the aspect of the invention illustrated in FIG. 4.

FIG. 9 shows a flowchart of a method according to a further aspect of the present invention.

DETAILED DESCRIPTION

One aspect of the present invention provides a technique for reducing splice loss when a dispersion compensating fiber (DCF) is spliced using a fusion splicer. The techniques described herein are suitable for reducing splice loss when DCF is spliced to itself, or spliced to other kinds of fibers, such as a single-mode standard fiber (SSMF) using the so-called bridge splicing technique where a bridge fiber is spliced between lengths of DCF and SSMF to reduce overall splice loss. One such bridge splicing technique is described in U.S. patent application Ser. No. 09/667,031, filed on Sep. 21, 2000, owned by the assignee of the present application, the drawings and disclosure of which are incorporated herein in their entirety. In one embodiment of the present invention, splice loss reduction is achieved by doping the DCF cladding with phosphorus to soften the glass near the core region so that stress effects after splicing are reduced. It will be appreciated that the techniques described herein may also be applicable to fiber designs other than DCF designs.

Figure 1:
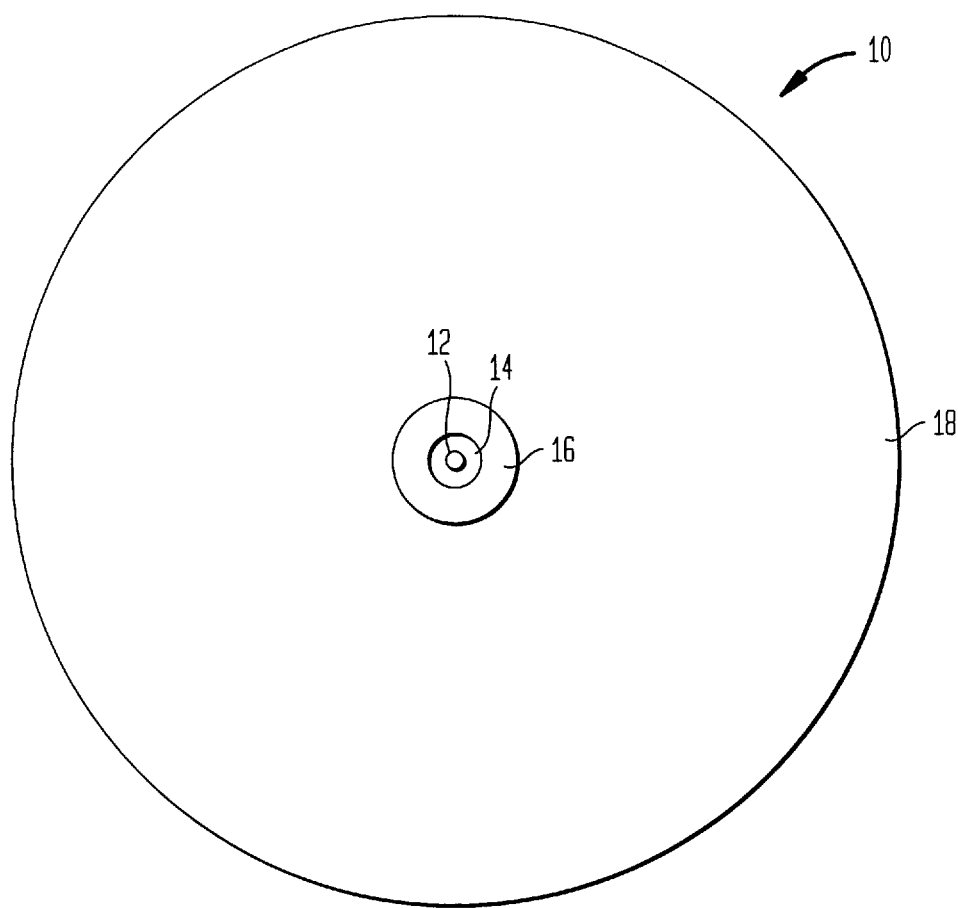
FIG. 1 shows a cross section of a length of DCF.
Figure 2:
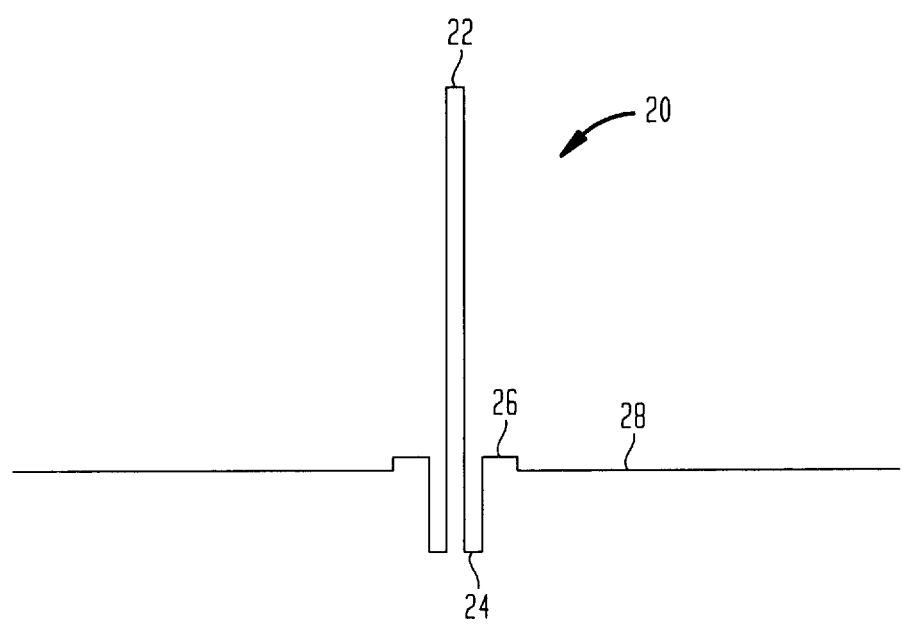
FIG. 2 shows a refractive index profile of the length of DCF shown in FIG. 1.

In general, DCF is difficult to splice because of its refractive index (RI) profile. FIG. 1 shows a cross section of a sample of a typical DCF 10, and FIG. 2 shows the Refractive Index profile 20 corresponding to the DCF 10 shown in FIG. 1. As shown in FIG. 1, the DGF includes a core 12, surrounded by a cladding that includes first, second, and third cladding regions 14, 16, and 18. As shown in FIG. 2, the RI profile includes a central spike 22 corresponding to the DCF core 12 a french 24 on either side of the spike 22 corresponding to the first cladding region 14, a ridge 26 on either side of each french 24 corresponding to the second cladding region 16, and a flat section 28 on either side of each ridge 26 corresponding to the third cladding region 18.

DCF is typically fabricated from a silicon dioxide ($SiO_2$) based glass. The desired RI profile is achieved by doping the core 12 and cladding regions 14, 16, and 18, with suitable dopants. In one DCF design, the core 12 is doped with germanium (Ge), the first cladding region is doped with fluorine (F), and the second cladding region is doped with germanium and fluorine (Ge/F).

To obtain a sufficiently deep trench 24 on either side of the core 22, the first cladding region 14 is doped with a relatively high concentration of fluorine dopant. Because fluorine starts to diffuse at a much lower temperature than the typical temperatures reached during fusion splicing, a significant amount of fluorine diffusion may occur during a typical fusion splicing operation. This diffusion results in a relatively high splice loss unless very short fusion times are used.

However, it is sometimes desirable to use longer fusion times. In one DCF design, the spotsize is approximately 5 μm, whereas a typical spotsize for SSMF is 10 μm. The difference in spotsize complicates the process of splicing DCF to SSMF. One technique used to compensate for a difference in spotsize is to use a longer fusion time. A longer fusion time results in a mode-field expansion in the DCF. By controlling the length of the fusion time, it is possible to control the amount of mode-field expansion in order to overcome the problem of mode-field mismatch. However, the longer fusion times required for mode-field expansion as noted above may result in undesirable diffusion of the fluorine dopant in the DCF cladding.

One solution to this problem, described in U.S. patent application Ser. No. 09/667,031, is to introduce a bridge fiber (BF) between the DCF and SSMF. The BF has the same spotsize as the DCF, but is not as heavily fluorine-doped as the DCF. Thus, the BF can be spliced to the DCF without any mode-field expansion. Because a short fusion time can be used, the problem of fluorine diffusion is avoided. When splicing the BF to SSMF, longer fusion times are then used to induce the desired mode-field expansion in the BF at the splice point between the BF and the SSMF. As a result of introducing the BF, the total splice loss between the DCF and SSMF is reduced.

However, even for BFs and DCFs having the same spotsize, significant splice loss values are observed when these fibers are spliced together. One explanation for these splice losses is the stress effects of the splicing process. According to the present invention, a significant reduction in this loss can be obtained by introducing phosphorus (P) into one or more of the cladding regions 14, 16, 18. The introduction of phosphorus softens the glass, thereby reducing the stress effects.

FIGS. 3 through 7 illustrate different exemplary combinations of how phosphorus may be satisfactorily introduced into the DCF in accordance with the present invention. It should be noted that because phosphorus doping affects propagation losses, there will be a tradeoff between improvement of splicing properties and propagation losses. Phosphorus can be introduced into the DCF using a modified chemical vapor deposition (MCVD) technique, in which core dopants are deposited in a quartz tube to define the preform that is then drawn into the finished fiber. Phosphorus is introduced by purging a flow of POCl$_3$ through the preform tube during the MCVD process when the relevant layers are deposited. Satisfactory results have been obtained using a concentration of 1% P$_2$O$_5$ (weight), although the present invention is not restricted to this particular concentration of phosphorus, or the particular technique used to introduce phosphorus into the DCF.

Figure 3:
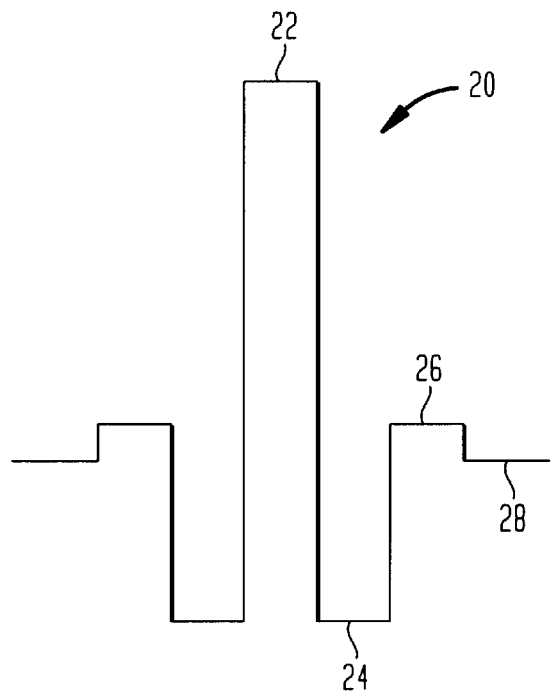
FIG. 3 shows the central section of the refractive index profile shown in FIG. 2 that has been re-scaled for the purposes of illustration.

FIG. 3 shows the central section of the RI profile shown in FIG. 2. For purposes of illustration, the RI profile has been re-scaled. It will be recalled from the above discussion that each location on the RI profile corresponds to a region of the DCF. The central spike 22 corresponds to the DCF core 12, the trenches 24 on either side of the central spike 22 correspond to the first cladding region 14, the ridges 26 on either side of each trench 22 correspond to the second cladding region 16, and the flat sections 18 on either side of each ridge 26 correspond to the third cladding region 18. Also, as mentioned above, the core 12 (spike 22) in the illustrated DCF design is doped with germanium, the first cladding region 14 (trench 24) is doped with fluorine, and the second cladding region 16 (ridge 26) is doped with germanium and fluorine.

Figure 4:
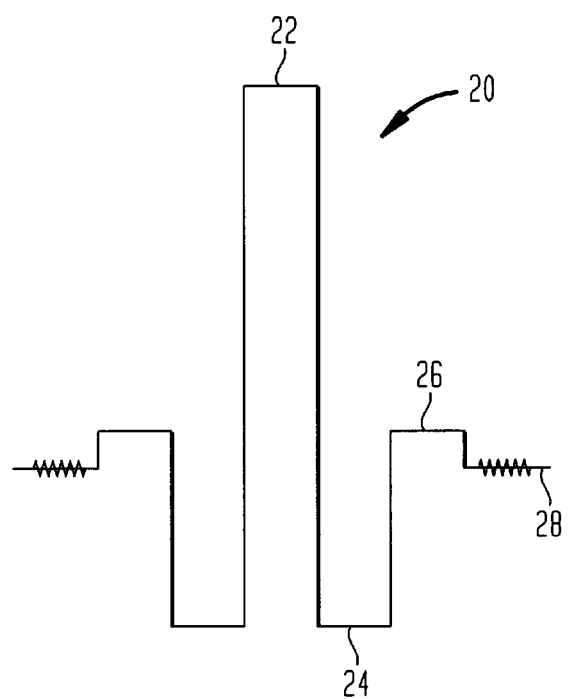
FIG. 4 shows a refractive index profile illustrating an optical fiber with reduced splice loss according to a first aspect of the present invention.

In one embodiment of the present invention, illustrated in FIG. 4, phosphorus (indicated by cross-hatching) is introduced into the third cladding region 28. According to a further aspect of the invention, whenever the third cladding region 28 is doped with phosphorus, it is also doped with fluorine in order to cancel out the increase in refractive index induced by the phosphorus.

Figure 5:
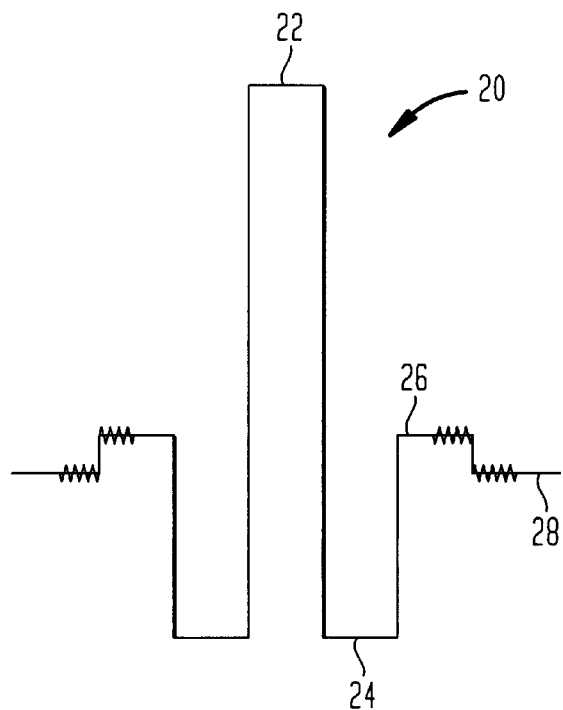
FIG. 5 shows a refractive index profile illustrating an optical fiber with reduced splice loss according to a second aspect of the present invention.

In a second embodiment of the present invention, illustrated in FIG. 5, phosphorus is introduced into a region of the DCF that overlaps the second and third cladding regions 26 and 28. Thus, the outer portion of the second cladding region 26 is doped with germanium, fluorine and phosphorus, and the third cladding region 28 is doped with fluorine and phosphorus. The phosphorus doping of the third cladding region 28 may extend throughout the third cladding region 28 or may be confined to an inner portion of the third cladding region 28.

Figure 6:
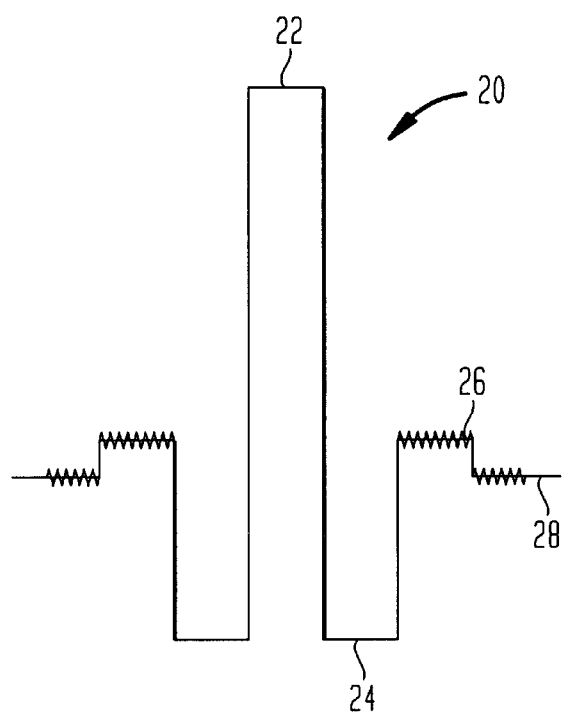
FIG. 6 shows a refractive index profile illustrating an optical fiber with reduced splice loss according to a third aspect of the present invention.

In a third embodiment of the present invention, illustrated in FIG. 6, phosphorus is introduced throughout the second cladding region 26, extending into the third cladding region 28. Thus, the entire second cladding region is now doped with phosphorus, fluorine, and germanium, and the third cladding region 28 is doped with phosphorus and fluorine. Again, the phosphorus doping of the third cladding region 28 may extend throughout the third cladding region 28 or may be confined to an inner portion of the third cladding region 28.

FIGS. 7 and 8 show tables 30 and 40, comparing splice loss at 1550 nm for an x3 DCF design manufactured at Lucent Technologies Denmark A/S. The FIG. 7 table 30 shows splice loss data for a x3 DCF without phosphorus in the cladding, and the FIG. 8 table 40 shows splice loss data for the same x3 DCF design with phosphorus added to the cladding according to the technique illustrated in FIG. 4 and discussed above. In order to provide a valid comparison of the two DCFs, the same BF was used for both tests. In other words, one of the two DCFs was spliced to a length of BF and tested for splice loss. The first DCF was then cut away from the BF. Then, the second DCF was spliced to the same BF and tested for splice loss. The increment in propagation loss due to the modification was below 0.01 dB/km. As shown in FIG. 7 and FIG. 8, the addition of phosphorus to the cladding results in a significant decrease in splice loss.

FIG. 9 shows a flowchart of a method 50 for fabricating a DCF according to a further aspect of the present invention. In the present embodiment of the invention, the DCF is fabricated using a modified chemical vapor deposition (MCVD) technique. It would also be possible to use other suitable techniques, including, but not limited to, outside vapor deposition (OVD), and vapor axial deposition (VAD). According to the MCVD technique, the core and cladding materials are deposited as soot layers onto the interior surface of a tube fabricated from silica glass, quartz, or other suitable material. The core and cladding materials are then heated and drawn into optical fiber, with the tube forming an outer cladding region in the finished fiber. For the purposes of the present discussion, the first, second, and third cladding regions are here referred to respectively as inner, intermediate, and outer cladding regions or layers.

As shown in FIG. 9, in step 52, an intermediate cladding material is deposited as a layer of soot onto the inner surface of a tube fabricated from the outer cladding material. In step 54, the inner cladding material is deposited as a soot layer onto the intermediate cladding material. In step 56, the core material is deposited as a soot layer onto the inner cladding material. The core and cladding materials are doped to create a refractive index profile characteristic of DCF. A portion of the cladding is doped with phosphorus, as described above. In step 58, the core and cladding materials are heated and drawn into optical fiber.

While the foregoing description includes details which will enable those skilled in the art to practice the invention, it should be recognized that the description is illustrative in nature and that many modifications and variations thereof will be apparent to those skilled in the art having the benefit of these teachings. It is accordingly intended that the invention herein be defined solely by the claims appended hereto and that the claims be interpreted as broadly as permitted by the prior art.

We claim:

1. A dispersion comprising fiber, comprising:

a core, cladding, including a first cladding region surrounding the core, a second cladding region surrounding the first cladding region, and a third cladding region surrounding the second cladding region, the core, and the first, second, and third cladding regions being doped to create a refraction index profile characteristic of dispersion compensating fiber, a portion of the cladding being doped with phosphorus, thereby resulting in splice loss reduction, the phosphorus-doped portion of the cladding also being doped with a second dopant to compensate for an increase in refractive index induced by the phosphorus, wherein the core is doped with geranium, the first cladding region is doped with fluorine, and the second cladding region is doped with geranium and fluorine.

2. The dispersion compensating fiber of claim 1, wherein the phosphorus-doped portion of the cladding includes a portion of the third cladding region.

3. The dispersion compensating fiber of claim 2, wherein the second dopant is fluorine.

4. The dispersion compensating fiber of claim 1, wherein the phosphorus-doped portion of the cladding overlaps the second and third cladding regions.

5. The dispersion compensating fiber of claim 1, wherein the phosphorus-doped portion of the cladding includes the second cladding region and extends into the third cladding region.

6. A method for fabricating dispersion compensating fiber, comprising:

(a) depositing a layer of intermediate cladding material doped with germanium and fluorine onto an inner surface of a tube fabricated from an outer cladding material;

(b) depositing a layer of inner cladding material doped with fluorine onto the layer of intermediate cladding material;

(c) depositing a layer of core material doped with germanium onto the layer of inner cladding material, the core and cladding materials being doped to create a refraction index profile characteristic of dispersion compensating fiber, a portion of the cladding being doped with phosphorus, thereby resulting in a reduction of splice loss, and being doped with a second dopant to compensate for an increase in refractive index induced by the phosphorus; and (d) drawing the core and cladding materials into optical fiber.

7. The method of claim 4, wherein the phosphorus-doped portion of the cladding includes a portion of the outer cladding layer.

8. The method of claim 7, wherein the second dopant is fluorine.

9. The method of claim 6, wherein the phosphorus-doped portion of the cladding overlaps the intermediate and outer cladding layers.

10. The method of claim 6, wherein the phosphorus-doped portion of the cladding includes the intermediate cladding layer and extends into the outer cladding layer.

11. The method of claim 6, wherein phosphorus is introduced into the dispersion compensating fiber by purging a flow of $POCl_3$ through the tube.

12. The method of claim 11, wherein phosphorus is introduced into the dispersion compensating fiber using a concentration of 1% $P_2O_5$.

* * * * *